United States Patent Office

3,738,955
Patented June 12, 1973

3,738,955
IMPERMEABLE BUILDING MATERIAL
Keith B. Bozer and Lloyd H. Brown, Crystal Lake, and Daniel S. P. Eftax, Barrington, Ill., assignors to The Quaker Oats Company, Chicago, Ill.
No Drawing. Filed Feb. 3, 1971, Ser. No. 112,486
Int. Cl. C08g 51/04
U.S. Cl. 260—39 R                            14 Claims

ABSTRACT OF THE DISCLOSURE

A process for producing an impermeable bound aggregate building material composition comprising: (a) forming a monomeric binder mixture of specified amounts of monomeric furfuryl alcohol and a silane coupling agent of the general formula:

$$X-R'-Si-(OR'')_3$$

wherein R' is a short chain alkylene radical; R" is aryl, alkyl, substituted aryl, or furfuryl; and X is amino, mercapto, epoxy, or glycidoxy; (b) forming a mixture of specified amounts of aggregate and acidic catalyst; (c) admixing specified amounts of the monomeric binder with specified amounts of the aggregate-acidic catalyst mixture; and (d) admixing specified amounts of clay with the bound aggregate.

BACKGROUND OF THE INVENTION

Field of the invention

This invention relates to an impermeable bound aggregate building material composition and in particular to a process for producing the composition.

Description of the prior art

Perhaps the most common building material composition is concrete prepared by binding aggregate with portland cement. This standard building material however has several deficiencies. Included among these deficiencies is that of curing since it normally takes about 28 days to achieve a suitable cure in portland cement. Another problem associated with portland cement is that it is not substantially chemically resistant to acids. Still another problem associated with portland cement bound aggregates is that when these materials are formed into building blocks, they are not impermeable and therefore need to be sealed with a sealing material after building is completed. There is, therefore, a need for a building material composition which can overcome the problems associated with portland cement prepared concrete.

Several attempts have been made to produce building material compositions that will overcome the above-described problems. Among these are the preparation of furan plastics by a mixture of furfuryl alcohol polymer and plaster of paris. Other attempts include the use of polymeric resins in admixture with portland cement. Still other attempts include the use of polymerized resins or other coating material to provide a seal for portland cement. Still further attempts have included furfuryl resins or polymerized furfuryl alcohol as an ingredient in an aggregate mixture. None of these previous methods have adequately provided all the properties desired in a building material.

This invention provides a new and novel process which overcomes many of the problems and difficulties associated with the prior art.

SUMMARY OF THE INVENTION

It is an object of this invention to produce a building material composition that is substantially impermeable.

It is another object of this invention to produce an impermeable building material composition that has improved compressive strength.

It is another object of this invention to produce an impermeable bound aggregate building material composition that cures rapidly in relation to portland cement.

It is still another object of this invention to provide an impermeable bound aggregate building material composition that has high acid resistance.

The objects of this invention are accomplished by a process for producing a substantially impermeable bound aggregate building material composition comprising the steps of:

(a) Forming a first package comprising a monomeric binder mixture of from 99.5 percent to 99.875 percent by weight monomeric furfuryl alcohol and from 0.5 percent to 0.0125 percent by weight of a silane coupling agent of the general formula:

$$X-R'-Si-(OR'')_3$$

wherein R' is a short chain alkylene having between about 3 and 6 carbon atoms; R" is a radical selected from the group consisting of aryl, substituted aryl, alkyl, and heteroalkyl; and X is a reactive member selected from the group consisting of amino, mercapto, epoxy, and glycidoxy;

(b) Forming a second package comprising a mixture of aggregate and acidic catalyst, said aggregate and said acidic catalyst being mixed in a proportion such that when from 2 percent to 20 percent by weight monomeric binder is mixed with from 98 percent to 80 percent by weight of the aggregate-acidic catalyst mixture, the acidic catalyst is present in an amount of from 5 percent to 50 percent by weight of the monomeric binder;

(c) Admixing said first package and said second package in amounts such that said first package contributes 2 percent to 20 percent by weight of the mixture and said second package contributes 98 percent to 80 percent by weight of the mixture;

(d) Admixing the above mixture with clay in amounts such that the clay represents from 1 percent to 30 percent by weight of the final mixture.

Although it is not required, it is sometimes desirable to use from 2 percent to 10 percent by weight of aqueous urea-formaldehyde mixture in forming the monomeric binder.

The aqueous urea-formaldehyde mixtures that may be optionally used are sold in commerce. One example is "U.F. Concentrate-85" acid by the Nitrogen Division of Allied Chemical & Dye Corporation, South Point, Ohio. Another aqueous urea-formaldehyde mixture is made by E. I. du Pont de Nemours and Company, Wilmington, Del., and is marketed as "Urea-Formaldehyde 25–60." Other examples of aqueous urea-formaldehyde mixtures are "Sta-Form 60" by Georgia-Pacific Company, Portland, Oreg., "UF–85" and "UF–78" by Borden Chemical Division, Borden, Inc., New York, N.Y., "Agrimine" by Reichhold Chemical, Inc., White Plains, N.Y., "Formourea 60" by Montecatinic Edison of Italy, and "Formol 55" by Badische Anilin-& Soda-Fabrik of Germany. The formaldehyde urea and equilibrium reaction products theerof present in aqueous urea-formaldehyde mixtures are believed to exist in equilibria as follows:

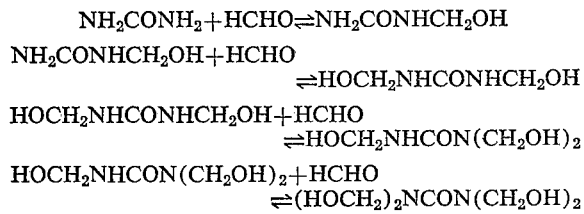

$$NH_2CONH_2 + HCHO \rightleftharpoons NH_2CONHCH_2OH$$

$$NH_2CONHCH_2OH + HCHO$$
$$\rightleftharpoons HOCH_2NHCONHCH_2OH$$

$$HOCH_2NHCONHCH_2OH + HCHO$$
$$\rightleftharpoons HOCH_2NHCON(CH_2OH)_2$$

$$HOCH_2NHCON(CH_2OH)_2 + HCHO$$
$$\rightleftharpoons (HOCH_2)_2NCON(CH_2OH)_2$$

the above equilibria illustrate what is meant by the phrase "a non-polymerized aqueous mixture of formaldehyde urea, and equilibrium reaction products thereof," which is herein claimed as an aqueous urea-formaldehyde mixture. Those urea molecules in the equilibria shown above that have more than one methylol radical attached are sometimes referred to as polymethylol ureas. There is difficulty encountered in distinguishing between the different polymethylol ureas in the aqueous urea-formaldehyde mixtures. For this reason the composition of the aqueous urea-formaldehyde solution is reported in terms of the weight percent urea and formaldehyde. A typical analysis of Allied Chemical's aqueous urea-formaldehyde mixture ("U.F. Concentrate-85") shows 59 percent by weight formaldehyde, 26 percent by weight urea, and about 15 percent by weight water.

The optional aqueous urea-formaldehyde mixture hereinbefore described may contain from about 5 percent to about 25 percent by weight water.

It is to be noted that the aqueous urea-formaldehyde mixture as described herein can optionally be present in an amount of from 2 percent to 10 percent by weight. At the upper concentration of aqueous urea-formaldehyde, i.e. 10 percent and above, the concentration of free formaldehyde begins to create a formaldehyde odor that makes the binder unacceptable due to personnel exposure. This invention, therefore, makes use of an aqueous urea-formaldehyde mixture without presenting the serious problems normally associated with the use of formaldehyde.

While we prefer to use gamma-aminopropyltriethoxysilane, other suitable silane coupling agents include for example the following:

gamma-mercaptopropyltrimethoxysilane;
N-beta-(aminoethyl)-gamma-aminopropyltrimethoxysilane;
beta-(3,4-epoxycyclohexyl)ethyltrimethoxysilane;
gamma-glycidoxypropyltrimethoxysilane;
gamma-aminopropyltriphenoxysilane;
gamma-aminopropyltribenzyloxysilane;
gamma-aminopropyltrifurfuroxysilane;
gamma-aminopropyltri(o-chlorophenoxy)silane;
gamma-aminopropyltri(p-chloorphenoxy)silane; and
gamma-aminopropyltri(tetrahydrofurfuroxy)silane.

The monomeric binder mixture of this invention also includes from 99.5 percent to 99.125 percent by weight monomeric furfuryl alcohol. It is to be emphasized that the furfuryl alcohol must be monomeric as opposed to polymerized furfuryl alcohol, furfuryl alcohol resins, or condensed furfuryl alcohol. It must also be emphasized that the binder mixture of this invention be monomeric and not contain substantial quantities of polymerized ingredients.

One of the particular advantages of this invention is that the furfuryl alcohol is resinified in situ in the mixture rather than prior to addition to the mixture. This result has an obvious important commercial advantage.

The use of large amounts of furfuryl alcohol as compared to relatively small amounts of urea-formaldehyde mixture is new to the art. Generally, binder mixtures using furfuryl alcohol and urea have tended to have much smaller amounts of furfuryl alcohol with much larger amounts of urea-formaldehyde.

This invention includes forming a mixture of aggregate and acidic catalyst to be mixed with the monomeric binder mixture. The acidic catalyst must be mixed with the aggregate in a proportion such that when from 2 percent to 20 percent by weight monomeric binder is mixed with from 80 percent to 98 percent by weight of the aggregate acidic catalyst mixture, the acidic catalyst is present in an amount of from 5 percent to 50 percent by weight of the monomeric binder.

The building material composition of this invention comprises a bound aggregate. Generally, an aggregate may be said to be grains of mineral matter that exceed about 0.01 mm. in diameter, and thus an aggregate may be taken to be divided mineral matter which does not have a major portion of its content comprising particles having a diameter smaller than 0.01 mm. This definition therefore includes "sand" plus other materials of larger particle size.

This invention includes the admixing of the aggregate with an acidic catalyst. Generally, an acidic catalyst may be employed, e.g. toluene sulfonic acid, phosphoric acid, ammonium chloride, ammonium trichloroacetate, ammonium phosphate, ammonium sulfate and ammonium nitrate. A solution of 70 percent toluene sulfonic acid in water and an 85 percent solution of phosphoric acid in water are particularly well adapted for use as a catalyst in this invention.

It is critical to this invention that the clay be admixed in the composition only after all of the other components have been thoroughly mixed together. If the order of mixing of the clay is altered to where it is added either to the monomeric binder or to the aggregate-catalyst system before the mixture is complete, the resulting products will have tensile strengths substantially below those found in products produced by the process of this invention.

Any clay may be used in this invention as long as it is not so basic that it will substantially react with the acidic catalyst to destroy functionality of the catalyst. Alumina silicate and kaolinite clays are particularly acceptable for use in this invention while montmorillonites and Wyoming bentonite are unacceptable for use in this invention. The clay for use in this invention may therefore be more fully described as a clay which is substantially as acidic as alumina silicate clay and kaolinite clay.

In practicing this invention the monomeric binder mixture is first prepared by admixing the components as hereinbefore described. Also. the aggregate and acidic catalyst are prepared in the proportion hereinbefore described. Next, the monomeric binder is mixed with the aggregate-acidic catalyst. In this mixture the monomeric binder constitutes from 2 percent to 20 percent by weight of the mixture while the aggregate-acidic catalyst mixture constitutes the remaining 80 percent to 98 percent by weight of the mixture. Finally, the clay is admixed with the binder-aggregate-acidic catalyst mixture. In this final mixture, the clay represents from 1 percent to 30 percent by weight of the total final mixture.

DESCRIPTION OF THE PREFERRED EMBODIMENTS

Example 1 may be taken to be a preferred embodiment of this invention:

Example 1

A monomeric binder was prepared by admixing 92 parts by weight furfuryl alcohol, 8 parts by weight urea-formaldehyde mixture (urea-formaldehyde 85 type) and 0.1 part by weight gamma-aminopropyltriethoxysilane. A quantity of aggregate was then weighed and set aside. A quantity of the monomeric binder equal to 6 percent by weight was then weighed and set aside. Next, a quantity of a 74 percent solution of toluene sulfonic acid in water equal to 20 percent by weight of the monomeric binder was admixed with the aggregate. After the aggregate and acid were thoroughly mixed, the monomeric binder was thoroughly mixed therein. Immediately upon this mixing being completed, 15 percent by weight, based on the total weight of the mixture, of an alumina silicate clay was thoroughly mixed therein. Four cores were prepared from this mixture and cured for 3 days. The average compressive strength of these samples was 5444 p.s.i., and the samples were found to be substantially impermeable to water.

Example 2

An impermeable building material is formed by following the procedure of Example 1 and using the same materials and quantities as in Example 1 except that gamma-mercaptopropyltriethoxysilane is used in place of gamma-aminopropyltriethoxysilane.

Example 3

Another impermeable building material is formed by following the procedure of Example 1 and using the same materials and quantities as in Example 1 except that gamma-aminopropyltrifurfuroxysilane is used in place of gamma-aminopropyltriethoxysilane.

Example 4

Example 1 was repeated with the exception that the binder was comprised of 99.9 percent by weight furfuryl alcohol and 0.1 percent by weight gamma-aminopropyltriethoxysilane. The average compressive strength of the samples was 4240 p.s.i., and the samples were found to be impermeable to water.

Example 5

Example 1 was repeated except the clay was admixed with the monomeric binder before the binder was admixed with the aggregate-acid mixture. Four cores were prepared from this mixture and cured for 3 days. These samples were found to have an average compressive strength of 3297 p.s.i. which was only about half of the compressive strength of the cores of Example 1. This example is not in accordance with this invention.

Examples 1 through 5 inclusive clearly demonstrate the advantage achieved by this invention. The samples of Examples 1 and 4 were found to have compressive strengths of 5444 p.s.i. and 4240 p.s.i. respectively, as compared to the samples of Example 5 which had a compressive strength of about 3300 p.s.i. Since the same binder system was used to bind the concrete in both Example 1 and Example 5, the steps followed in Example 1, which are in accordance with this invention are clearly shown to produce a superior result.

The results of Examples 1 through 5 inclusive are also important when compared to the compressive strength of conventional portland cement prepared concrete. Portland cement prepared concrete can be prepared with compressive strengths in the range of from 4000 to 5000 p.s.i. It is observed that the samples produced in Example 5 fall short of the compressive strength of portland cement prepared concrete. It is also observed that the compressive strength of the samples produced in accordance with this invention are either within or substantially above the compressive strengths of portland cement prepared concrete.

In comparison to other resin bound aggregate systems, when Example 1 was repeated using a typical isophthalic polyester resin which was extended with styrene and catalyzed with 1¼ percent by weight methyl ethyl ketone peroxide, the samples were found to have an average compressive strength of 1385 p.s.i., a value far below that demonstrated by this invention.

In addition to the dramatic improvement in compressive strength, the samples produced in accordance with this invention are also impermeable. This has its obvious advantage when compared to a normal concrete block which does not present any substantial barrier to moisture.

Having fully defined this new and unique invention, we claim:

1. A process for producing a bound aggregate building material composition comprising the steps of:
    (a) forming a first package comprising a monomeric binder mixture of from 99.5 percent to 99.875 percent by weight monomeric furfuryl alcohol and from 0.5 percent to 0.0125 percent by weight of a silane coupling agent of the general formula:

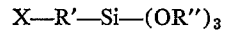
    $$X-R'-Si-(OR'')_3$$

wherein R' is a short chain alkylene having between about 3 and 6 carbon atoms; R'' is a radical selected from the group consisting of aryl, substituted aryl, alkyl, and furfuryl; and X is a reactive member selected from the group consisting of amino, mercapto, epoxy, and glycidoxy;
    (b) forming a second package comprising a mixture of aggregate and acidic catalyst, said aggregate and said acidic catalyst being present in a proportion such that when from 2 percent to 20 percent by weight monomeric binder is mixed with from 98 percent to 80 percent by weight of the aggregate-acidic catalyst mixture, the acidic catalyst is present in an amount of from 5 percent to 50 percent by weight of the monomeric binder;
    (c) admixing said first package and said second package in amounts such that said first package contributes 2 percent to 20 percent by weight of the mixture and said second package contributes 98 percent to 80 percent by weight of the mixture;
    (d) admixing the above mixture with clay which is not so basic that it will substantially react with the acidic catalyst to destroy the functionality of the catalyst in amounts such that the clay represents from 1 percent to 30 percent by weight of the final mixture.

2. The process as in claim 1 in which said acidic catalyst is toluene sulfonic acid.

3. A process as in claim 2 wherein the first package also contains from 2 percent to 10 percent by weight aqueous ureaformaldehyde mixture and wherein said aqueous urea-formaldehyde mixture contains from about 5 percent to about 25 percent by weight water.

4. The process as in claim 1 wherein said silane coupling agent is gamma-aminopropyltriethoxysilane.

5. The process as in claim 1 wherein said silane coupling agent is gamma-mercaptopropyltrimethoxysilane.

6. The process as in claim 1 wherein said silane coupling agent is N-beta-(aminoethyl)-gamma-aminopropyltrimethoxysilane.

7. The process as in claim 1 wherein said silane coupling agent is beta-(3,4-epoxycyclohexyl)ethyltrimethoxysilane.

8. The process as in claim 1 wherein said silane coupling agent is gamma-glycidoxypropyltrimethoxysilane.

9. The process as in claim 1 wherein said silane coupling agent is gamma-aminopropyltriphenoxysilane.

10. The process as in claim 1 wherein said silane coupling agent is gamma-aminopropyltribenzyloxysilane.

11. The process as in claim 1 wherein said silane coupling agent is gamma-aminopropyltrifurfuroxysilane.

12. The process as in claim 1 wherein said silane coupling agent is gamma-aminopropyltri(o-chlorophenoxy)silane.

13. The process as in claim 1 wherein said silane coupling agent is gamma-aminopropyltri(p-chlorophenoxy)silane.

14. The process as in claim 1 wherein said silane coupling agent is gamma-aminopropyltri(tetrahydrofurfuroxy)silane.

(References on following page)

References Cited

UNITED STATES PATENTS

| | | | |
|---|---|---|---|
| 3,487,043 | 12/1969 | Grudus | 260—88.5 X |
| 3,020,609 | 2/1962 | Brown et al. | 164—43 X |
| 2,768,408 | 10/1956 | Stridle et al. | 260—88.5 X |
| 3,419,517 | 12/1968 | Hedrick et al. | 260—37 N |
| 3,328,231 | 6/1967 | Lergonic | 260—40 R |
| 3,538,035 | 11/1970 | Cleek et al. | 164—43 X |
| 3,360,492 | 12/1967 | Tsou | 260—39 R |
| 3,220,970 | 11/1965 | Carlström | 260—88.5 X |
| 2,686,729 | 8/1954 | Barry | 106—68 X |
| 3,078,249 | 2/1963 | Russell | 260—40 R |
| 3,205,191 | 9/1965 | Watson et al. | 260—37 R |
| 3,290,165 | 12/1966 | Iannicelli | 260—41.5 R X |
| 3,639,654 | 2/1972 | Robins | 260—37 R |

OTHER REFERENCES

S. Stermon & J. Marsden: "Silane Coupling Agents," from I & EC, vol. 58, No. 3 (March 1966), pp. 33–7.

MORRIS LIEBMAN, Primary Examiner

S. M. PERSON, Assistant Examiner

U.S. Cl. X.R.

106—68; 260—37 R, 395 B